United States Patent [19]

Enstrom

[11] Patent Number: 5,530,895

[45] Date of Patent: Jun. 25, 1996

[54] SYSTEM AND METHOD FOR COMPUTER INTERFACE BOARD IDENTIFICATION BY SERIALLY COMPARING IDENTIFICATION ADDRESS BITS AND ASSERTING COMPLEMENTARY LOGIC PATTERNS FOR EACH MATCH

[75] Inventor: Mark R. Enstrom, Redmond, Wash.

[73] Assignee: Microsoft Corporation, Redmond, Wash.

[21] Appl. No.: 23,689

[22] Filed: Feb. 25, 1993

[51] Int. Cl.$^6$ .............................. G06F 9/00; G06F 11/00; G06F 11/28

[52] U.S. Cl. .................... 395/829; 395/284; 364/DIG. 1; 364/ 280.1; 364/DIG. 2; 364/927.93; 364/929.4

[58] Field of Search ................................. 395/823, 824, 395/829, 284

[56] References Cited

U.S. PATENT DOCUMENTS

| | | | |
|---|---|---|---|
| 3,818,447 | 6/1974 | Craft | 340/147 LP |
| 4,360,870 | 11/1982 | McVey | 395/275 |
| 4,412,280 | 10/1983 | Murphy et al. | 395/182.08 |
| 4,516,205 | 5/1985 | Eing et al. | 364/200 |
| 4,578,773 | 3/1986 | Desai et al. | 395/275 |
| 4,660,141 | 4/1987 | Ceccon et al. | 364/200 |
| 4,730,251 | 3/1988 | Aakre et al. | 395/325 |
| 4,750,136 | 6/1988 | Arpin et al. | 395/275 |
| 4,815,034 | 3/1989 | Mackey | 395/275 |
| 5,014,193 | 5/1991 | Garner et al. | 395/275 |
| 5,257,387 | 10/1993 | Richek et al. | 395/800 |

FOREIGN PATENT DOCUMENTS 0375981  7/1990  European Pat. Off. .
0464987  1/1992  European Pat. Off. .

Primary Examiner—Thomas C. Lee
Assistant Examiner—D. Dinh
Attorney, Agent, or Firm—Seed and Berry

[57] ABSTRACT

A system and method for automatically identifying and configuring interface boards connected to a computer bus is disclosed. Each interface board contains a pair of interface ports that can be addressed by the system and a unique identification address. The interface boards are instructed to serially read the identification address and place a logic 10 in the two least significant bits of the data bus if the first data bit is a logic one. The serial read instruction is performed twice for each data bit in the identification address with a logic 01 data pattern placed on the data bus for the second serial read to assure that a floating data bus is not causing false readings. If no interface board responds to any particular read identification instruction, the system assigns a logic zero for that particular bit of the identification address. Any interface board not having a logic one for a particular first data bit in the identification automatically places itself in a disabled state if the first and second serial read instructions indicate that another interface board did have a logic one for that particular data bit of the identification address. By the time that the system has read all of the identification bits, one and only one interface board will have been identified and enabled. The system can read registers on the interface board to determine which resources are required for operation of that board and assigns parameters such as I/O address, interrupt line, and data channel line. The system enables the other previously disabled interface boards and repeats the identification instructions until all interface boards have been identified and configured.

25 Claims, 8 Drawing Sheets

SYSTEM AND METHOD FOR COMPUTER INTERFACE BOARD IDENTIFICATION BY SERIALLY COMPARING IDENTIFICATION ADDRESS BITS AND ASSERTING COMPLEMENTARY LOGIC PATTERNS FOR EACH MATCH

TECHNICAL FIELD

The present invention relates to a system and method for identifying computer interface boards in a computer system.

BACKGROUND OF THE INVENTION

Many different interface boards are available for use in computers. This is especially true of microcomputers where the user may purchase a variety of interface boards from many different manufacturers. For example, a typical computer system contains a keyboard interface, a video interface, a hard disk/floppy disk interface, and a printer interface that may all be from different manufacturers. Many system may have more than one of the same type of interface board. For example, a computer may contain several serial I/O ports for a modem, a mouse, a printer, or the like.

While microcomputers are able to operate all of these various interfaces, the boards must be properly installed for the entire system to work effectively. For proper installation, a typical interface board requires proper selection of a variety of parameters such as an I/O address, interrupt request (IRQ) line, and direct memory access (DMA) line. If these parameters are not properly selected for each interface board, there will be conflicts when using the data bus and control bus. These conflicts may cause erroneous results or can even cause the entire computer system to fail.

Some prior art system avoid this problem by assigning specific parameters to each interface slot in the computer. For example, a computer may have eight slots available for interface boards. The interface board itself does not contain address decoding circuitry; instead, the computer motherboard has address decoding for each of the particular slots such that each slot has a unique address. Thus, parameter selection is predetermined for each slot. If the computer requires additional information or parameters, the computer's software may query each interface board to determine what type of board is installed in each slot. Because the computer knows the addresses for each slot, there is no danger that an interface board will be inadvertently enabled while being queried by the computer. The computer can configure the software to properly support each of the interface boards installed in the addressable slots. Thus, slot addressability also solves the problem of inadvertently enabling an interface board.

While slot addressability is one solution to the problem of inadvertently enabling an interface board during the parameter selection and configuration process, some computer systems do not have slot addressability. The Industry Standard Architecture (ISA) bus, which is the most common microcomputer bus, does not have slot addressability. As shown in FIG. 1, the ISA bus contains an address bus 1, a data bus 2, a control bus 3, and a power bus 4. There is no slot addressability; instead, each interface board 5 contains its own address decoding circuit 6 as well as means for selecting other parameters. For example, a typical interface board may contain jumpers, DIP switches, or both, to select the address, the IRQ line and the DMA line. It is the user's responsibility to properly select these parameters so that a particular interface board will not interfere with other interface boards installed in the computer.

As a result, the user must become very knowledgeable about computer hardware simply to install an interface board. For a typical user, the installation of a single board into an existing system becomes an extraordinary effort that can be very discouraging. If the parameters for an interface board are not properly selected, the user may face intermittent errors or a complete system crash.

Therefore, it can be appreciated that there is a significant need for a system and method for automatically determining which boards are connected to a computer bus and automatically assigning parameter selections to ensure proper operation of all interfaces.

SUMMARY OF THE INVENTION

The invention is embodied in a system for identifying an interface board used with a computer. The interface board includes a plurality of internal registers addressable by the computer, at least some of the internal registers having both read and write capability, an address port coupled to the address bus of the computer and communicating with the internal registers to allow the computer to address the internal registers, and a command port coupled to the data bus on the computer and communicating with the internal registers to allow the computer to read and write data to the internal registers.

An address register on the interface board stores a plurality of address bits to provide a unique identification of the interface board. The computer uses the address port and command port to enable the reading of the address register by the interface board itself. A comparator on the interface board examines the address bits one at a time and then generates a match signal if the particular address bit has a first binary logic level. If a match signal is generated, a data bus interface places at least one signal data bit on the data bus.

An arbitration circuit examines the data bus if a match signal is not generated by the interface board. If the signal data bit is on the data bus, the arbitration circuit generates a disable signal to cause the interface board to enter a disabled state. A disabled interface board will not place the signal data bit on the data bus while in the disabled state.

The computer also reads the data bus after each bit and the address register is examined by the comparator. If the signal data bit is present on the data bus, the computer stores a first binary logic level in an address storage location as a valid identification bit. If the signal data bit is not present, the computer stores a second opposite binary logic level in the address storage location as a valid identification bit. When all address bits in the address register have been read, the address storage location contains the unique identification of one and only one interface board even though the computer may include several interface boards.

In one embodiment, the interface board contains configuration registers which specify information required for the proper operation of the interface board. The computer uses the address storage location to enable the reading of the configuration registers. The configuration registers may contain the device driver itself. Alternatively, the configuration registers may contain a file name identifying the name of a device driver file.

In one embodiment, the interface board generates first and second predetermined data patterns if a match signal is generated by the comparator. The arbitration circuit will not generate a disable signal unless both first and second data patterns are detected on the data bus. Similarly, the computer will store the first binary logic level in the address storage location only if both of the first and second predetermined data patterns are present on the data bus.

DETAILED DESCRIPTION OF THE INVENTION

The present invention allows a computer system to automatically detect each type of interface board connected to the computer bus using non-addressable interface slots. It does so in a manner that does not inadvertently enable more than one interface board at a time. When each interface board has been identified, the present invention determines what resources are required for each interface board. The inventive system then configures each interface with all necessary parameter selections so that all interfaces will operate in the computer without requiring the user to select any of the parameters. All necessary software drivers are identified by the inventive system; the user is prompted to insert a particular floppy disk if the interface requires software drivers supplied by the interface board manufacturer. Thus, the user can plug an interface board into the computer and the inventive system will complete the installation procedures. This greatly simplifies the installation process and allows users to install an interface board without the experimentation and frustration that typically accompanies such procedures. Furthermore, the present invention can detect multiple interface boards of the same type and can even operate satisfactorily in a computer that contains some prior art interface boards that do not have automatic configuration capability.

The present invention is described for use with a standard ISA bus, such as commonly found in IBM-compatible microcomputers. No description of the ISA bus is provided because it is well known to those skilled in the art of computer system design. For the sake of clarity, the description of the power bus and control bus have also been omitted since these are also well known. It is obvious to those skilled in the art that the principles of the present invention may be easily applied to other computer busses that do not have addressable interface slots.

Figure 1:
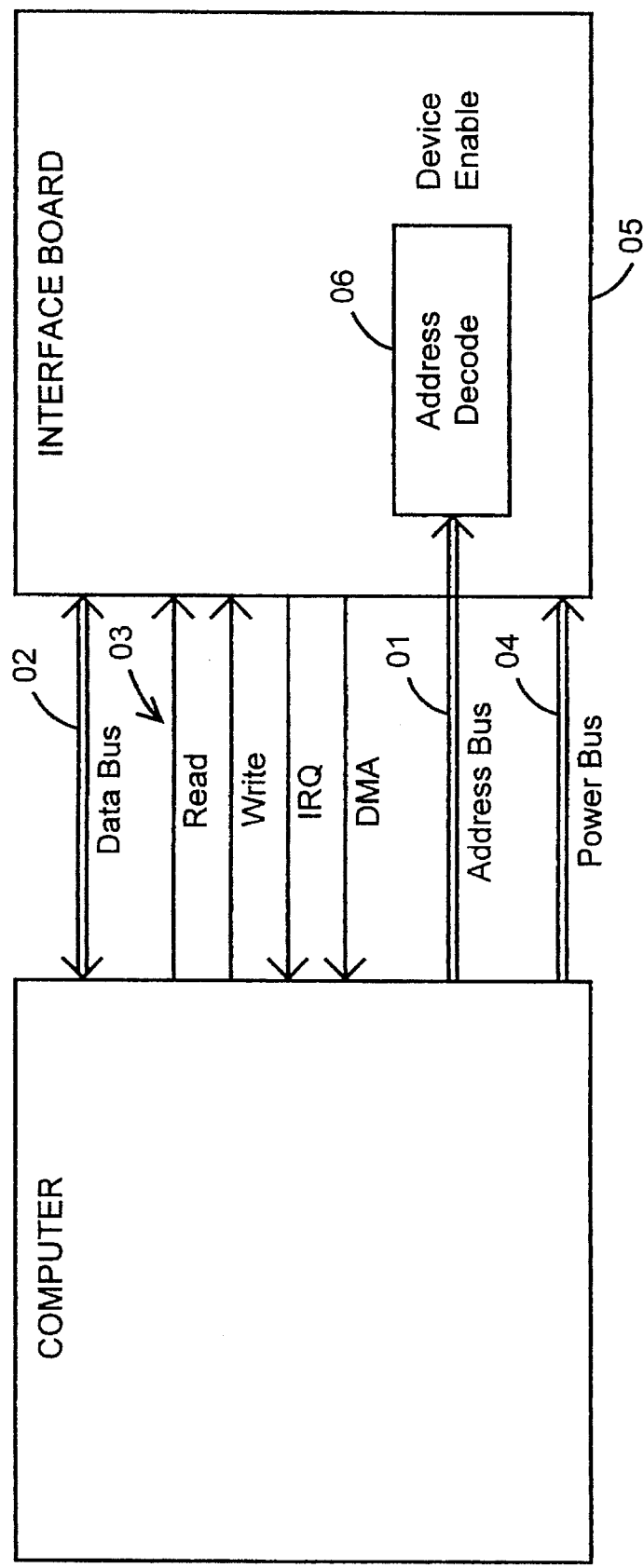
FIG. 1 is a functional block diagram of a computer and interface of the prior art.
Figure 2:
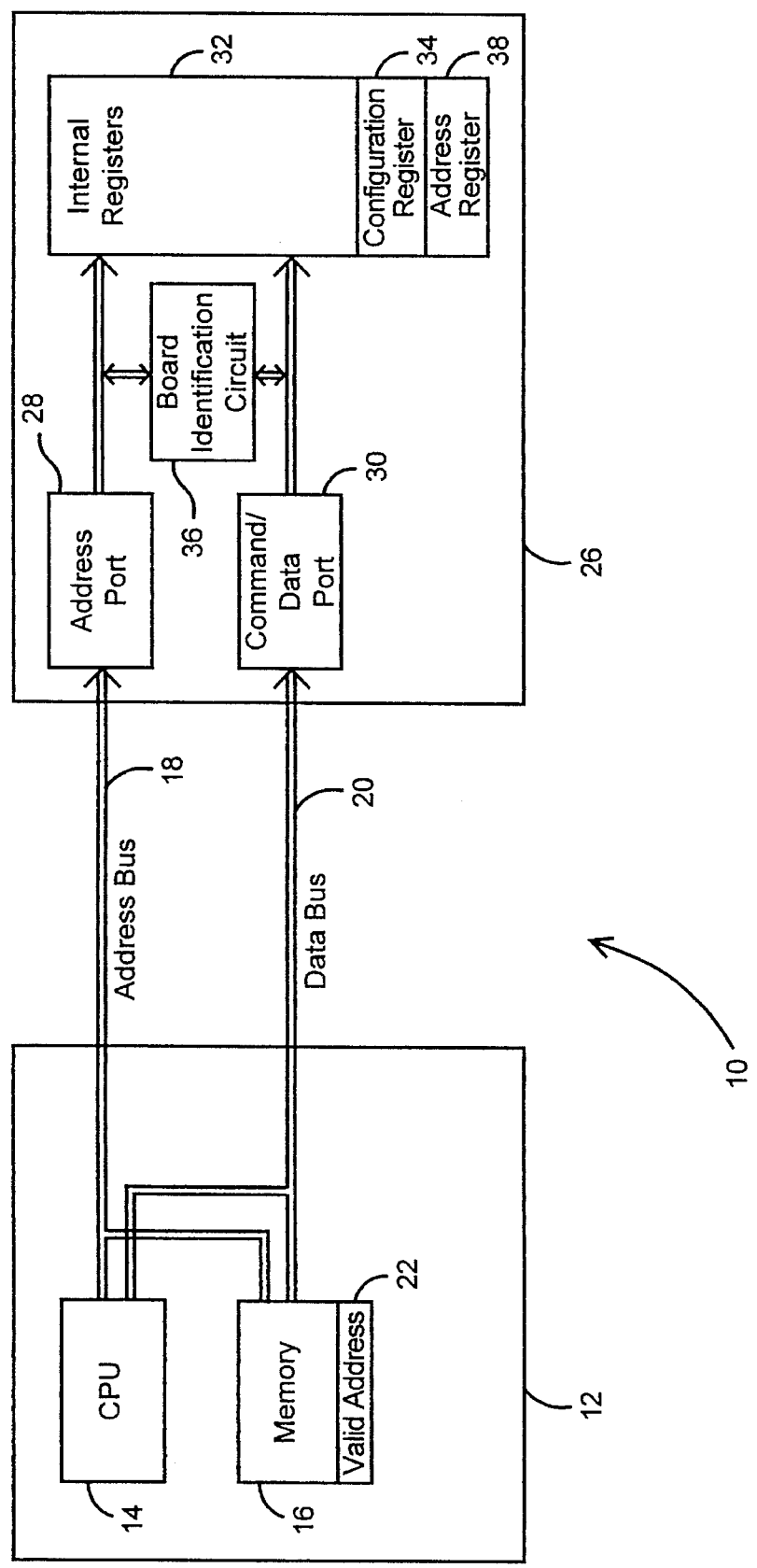
FIG. 2 is a functional block diagram of a computer and interface of the present invention.

The invention is embodied in a computer system 10, shown in block diagram form in FIG. 2. A host computer 12 contains a central processing unit (CPU) 14 and a memory 16, which may comprise random access memory (RAM) and read-only memory (ROM). The CPU 14 and the memory 16 are coupled to each other by an address bus 18, a data bus 20, a control bus (not shown), and a power bus (not shown). The operation of these components is well known to those of ordinary skill in the art and will not be discussed in detail herein. The computer 12 also has a valid address storage location 22 and is connected to at least one interface board 26. An interface board address is stored in the address storage location 22 as the system 10 identifies the interface board 26.

The interface board 26 designed according to the present invention is plugged into a standard ISA interface slot (not shown) which connects the interface board to the computer 12 via the address bus 18, the data bus 20, the control bus (not shown), and the power bus (not shown). A typical computer system 10 will contain a plurality of interface boards 26. It should also be noted that some computers 12 have interfaces that are mounted directly on the motherboard. The present invention relates to any interface coupled to the computer via the address bus 18 and the data bus 20 whether the interface is mounted on a motherboard or plugged into an interface slot. For the sake of clarity, only a single interface board 26 is shown in FIG. 2. Contained on the interface board 26 are an address port 28, a command/ dam port 30, and a set of internal registers 32. The interface board 26 also contains a plurality of configuration registers 34, which may be part of the internal registers 32. Operational details of these components are described below.

The configuration information stored by the configuration registers 34 is described in Table 1 below.

TABLE 1

| | Interface Board Configuration | |
|---|---|---|
| Field Name | Length | Definition |
| Device Identifier | 32 bits | 3 character 5 bit Compressed ASCII string identifying the board manufacturer plus 17 bits of manufacturer defined data to uniquely identify each interface board design. |
| Serial/Unique Number | 32 bits | Unique device number so the system can differentiate multiple interface boards of the same type in one system. |
| Implementation Descriptor | 8 bits | Identifies the revision number of the computer system 10. |
| Check Sum | 8 bits | Check Sum of all configuration data verifies that the above information is accurate configuration data from an interface board. |
| Logical Device Info | Variable | Logical device identifier and driver information for each logical function on the interface board. |

Referring to Table 1, the Device Identifier, which is a 32-bit code, identifies the manufacturer and the particular type of the interface board 26. A first portion of the Device Identifier identifies the manufacturer of the interface board 26. A second portion of the Device Identifier is used by the manufacturer to identify the particular type of interface. For example, a manufacturer may make disk controllers, printer interfaces, and video controllers. The manufacturer may use the second portion of the Device Identifier to uniquely identify the type of the interface board 26. Similarly, if the interface board 26 contains more than one interface, such as a parallel printer interface and two serial port interfaces, the manufacturer can use the Device Identifier to indicate that the particular model of the interface board 26 contains three separate interfaces.

The 32-bit Serial Number is also used by the manufacturer to uniquely identify each interface board 26 of a particular type. The Serial Number does not differentiate between different types of interface boards 26, but between interface boards 26 of the same type. For example, where computer system 10 includes more than one serial port interface boards of the same type, the Serial Number uniquely identifies the particular interface board 26 from the others. Thus, the interface board 26 has 64-bits that identify the manufacturer, board type, and serial number.

Following the Serial Number is an 8-bit Implementation Descriptor that identifies the revision of the configuration information on the interface board.

Following the Implementation Descriptor is an 8-bit checksum of all configuration information. The checksum is used to verify the accurate reading of the configuration information by the computer system 10. The use of a checksum to detect data transfer errors is well known in the art and will not be described in detail herein.

Following the checksum data field is a variable-length Logical Device Information Data Field containing resource configuration information for the interface board 26. An interface board 26 may contain more than one function, such as a video controller and a disk controller. Each separate function is identified as a logical device. Separate configuration information is required for each logical device. The Logical Device Information Data Field identifies each logical device on the interface board 26 and provides configuration information for each logical device. The Logical Device Information Data Field will be described in greater detail below.

As mentioned above, each logical device on the interface board 26 is identified in the variable-length Logical Device Information Data Field. The resource configuration data it contains provides resource information required for the proper operation of the interface board 26. The resource information may be the filename of a device driver data file that may, for example, be supplied by the manufacturer on a floppy disk. Alternatively, the device driver itself could be stored on the interface board 26. Regardless of where the device driver or other resource information is stored, the interface board 26 contains information to allow the computer system 10 to identify the appropriate device driver.

Before the identification of the interface boards 26 begins, the computer system 10 tests to determine if any prior art interface boards are connected to the computer 12. This is accomplished by checking the device driver files to determine which addresses are currently in use. The device driver files allow the computer system 10 to keep track of the configuration of any prior art interface boards so that configuration of the interface board 26 will not create conflicting parameters. If an additional prior art interface board is connected to the computer 12 after the configuration of the interface board 26 has been determined, the computer system 10 detects the presence of the additional prior art interface board by examining the device driver files. Assuming that the additional prior art interface board has been properly installed, the computer system 10 will check the device driver files to determine if a configuration conflict exists, and will reconfigure the interface board 26 if a conflict does exist. Thus, the computer system 10 always checks to see if there are prior art interface boards in the computer 12, and reconfigures the interface board 26 if configuration conflicts arise.

The internal registers 32 on the interface board 26 are used to store both data and commands. If the computer 12 addresses a command register in the internal registers 32, the interface board 26 will perform the function indicated by the particular command register. The contents of any of the internal registers 32 may be read by the computer 12 by loading the address port 28 with the address of the desired internal register. A read command is then loaded from the computer 12 into the command/data port 30, and in response, the interface board 26 places the contents of the selected one of the internal registers 32 on the data bus 20. Similarly, the computer 12 may write data to a selected one of the internal registers 32 by loading the address of the desired internal register from the computer 12 into the address port 28. Then the computer 12 writes the desired data into the command/data port 30. In response, the interface board 26 then loads the contents of the command/data port 30 into the selected one of the internal registers 32.

One of the internal registers 32 is the Command Register. The interface board 26 will execute commands sent to the Command Register. Table 2 below defines the Command Register.

TABLE 2

Interface Board Command Register Definitions

| Name | Address | Definition |
| --- | --- | --- |
| Serial Read Command | 0x0 | Writes to this port are ignored, reads return 1 bit of serial data if the card is in the DEVICE-ID state. |
| Reset Command | 0x1 | Force all interface boards in any state to the DEVICE-ID state. This command will also deactivate all interface boards. |
| Enable Command | 0x2 | Force interface boards in the DISABLE state to go to the DEVICE-ID state. |
| Wake Up Command | 0x3 | Force interface boards in the SLEEP state to go to the DEVICE-ID state. |
| Sleep Command | 0x4 | Force interface boards in the DEVICE-ID state to go to the SLEEP state. |
| Activate Command | 0x5 | Force interface boards in the DEVICE-ID state to become active. |
| De-Activate Command | 0x6 | Force interface boards in the DEVICE-ID state to become in-active. |
| Read Active Status | 0x7 | A read to this port returns the boards active status. Active interface boards return "1" on data bus <0>, inactive boards return "0". |
| READ ID Command | 0x8 | A read to this register causes a compare cycle for one bit of the boards ID. This process is fully described below. |
| Logical Device | 0x9 | This field selects the current logical device. All Reads and writes of memory, I/O, interrupt and DMA configuration information access the registers of the logical device written here. (0x4 to 0xD1) |

Detailed operation of the commands are provided below. These commands are sent from the computer 12 to the interface board 26 by simply addressing the register shown in the Address column above. In the presently preferred embodiment, there are actually no registers associated with these commands. However, the computer 12 sends the commands by addressing the "register" using the address port 28 and then writing any data value to the command/data port 30. The command is executed by the interface when the data value is written to the command/data port 30. For example, a serial read command is sent to the interface board 26 by addressing register 0. When the interface board 26 detects that a command "register" has been addressed, the interface board 26 executes the command.

Another one of the internal registers 32 is a Memory Address Register Map that contains a memory map for use with the interface board 26 if the interface board contains on-board memory. For example, the interface board 26 may be a network driver and have a large amount of on-board memory. As is well known in the art, the on-board memory must be mapped for proper operation. Table 3 below defines the Memory Address Register Map.

TABLE 3

Interface Board Register Memory Address Map

| Name | Address | Definition |
| --- | --- | --- |
| Memory Addr High 0 | 0x40 | Read/Write value indicating the selected Memory address bits <23:16> for memory descriptor 0. |
| Memory Addr Low 0 | 0x41 | Read/Write value the selected Memory address bits <15:11> for memory descriptor 0. |
| . . . | | <Memory base address for memory descriptors 1–30> |
| Memory Addr High 31 | 0x7E | Read/Write value indicating the selected Memory address bits <23:16> for memory descriptor 31. |
| Memory Addr Low 31 | 0x7F | Read/Write value indicating the selected Memory address bits <15:11> for memory descriptor 31. |

An I/O Address Map Register is also one of the internal registers 32, and has the I/O addresses that are used by the interface board 26 during normal I/O operation. Table 4 below defines the I/O Address Map Register.

TABLE 4

Register I/O Address Map

| Name | Address | Definition |
| --- | --- | --- |
| I/O Port Addr High 0 | 0x80 | Read/Write value indicating the selected I/O address bits <15:08> for I/O descriptor 0. |
| I/O Port Addr Low 0 | 0x81 | Read/Write value indicating the selected I/O address bits <07:00> for I/O descriptor 0. |
| . . . | | <I/O base addresses for I/O descriptors 1–30> |
| I/O Port Addr High 31 | 0xBE | Read/Write value indicating the selected I/O address bits <15:08> for I/O descriptor 31. |
| I/O Port Addr Low 31 | 0xBF | Read/Write value indicating the selected I/O address bits <07:00> for I/O descriptor 31. |

The internal registers 32 of the interface board 26 also includes a set of registers defining the interrupt channel selection and the DMA channel selection as shown in Table 5 below.

TABLE 5

Register Interrupt and DMA Address Map

| Name | Address | Definition |
| --- | --- | --- |
| Interrupt Level Select 0 | 0xC0 | Read/Write value indicating selected interrupt levels. Bits <3:0> select which interrupt level is used for Interrupt 0. |
| Interrupt Level Select 1 | 0xC1 | Read/Write value indicating selected interrupt levels. Bits <3:0> select which interrupt level is used for Interrupt 1. |

TABLE 5-continued

Register Interrupt and DMA Address Map

| Name | Address | Definition |
| --- | --- | --- |
| DMA Channel Select 0 | 0xD0 | Read/Write value indicating selected DMA channels. Bits <3:0> select which DMA channel is in use for DMA 0. |
| DMA Channel Select 1 | 0xD1 | Read/Write value indicating selected DMA channels. Bits <3:0> select which DMA channel is in use for DMA 1. |

The number of internal registers 32 depends on the type of interface(s) on the interface board 26. As previously stated, not all interface boards 26 need all possible parameters. However, there are some internal registers 32 that are contained on all interface boards 26. Also, the internal registers 32 may contain the device driver itself, as stated above, or may simply identify the device driver.

Figure 3:
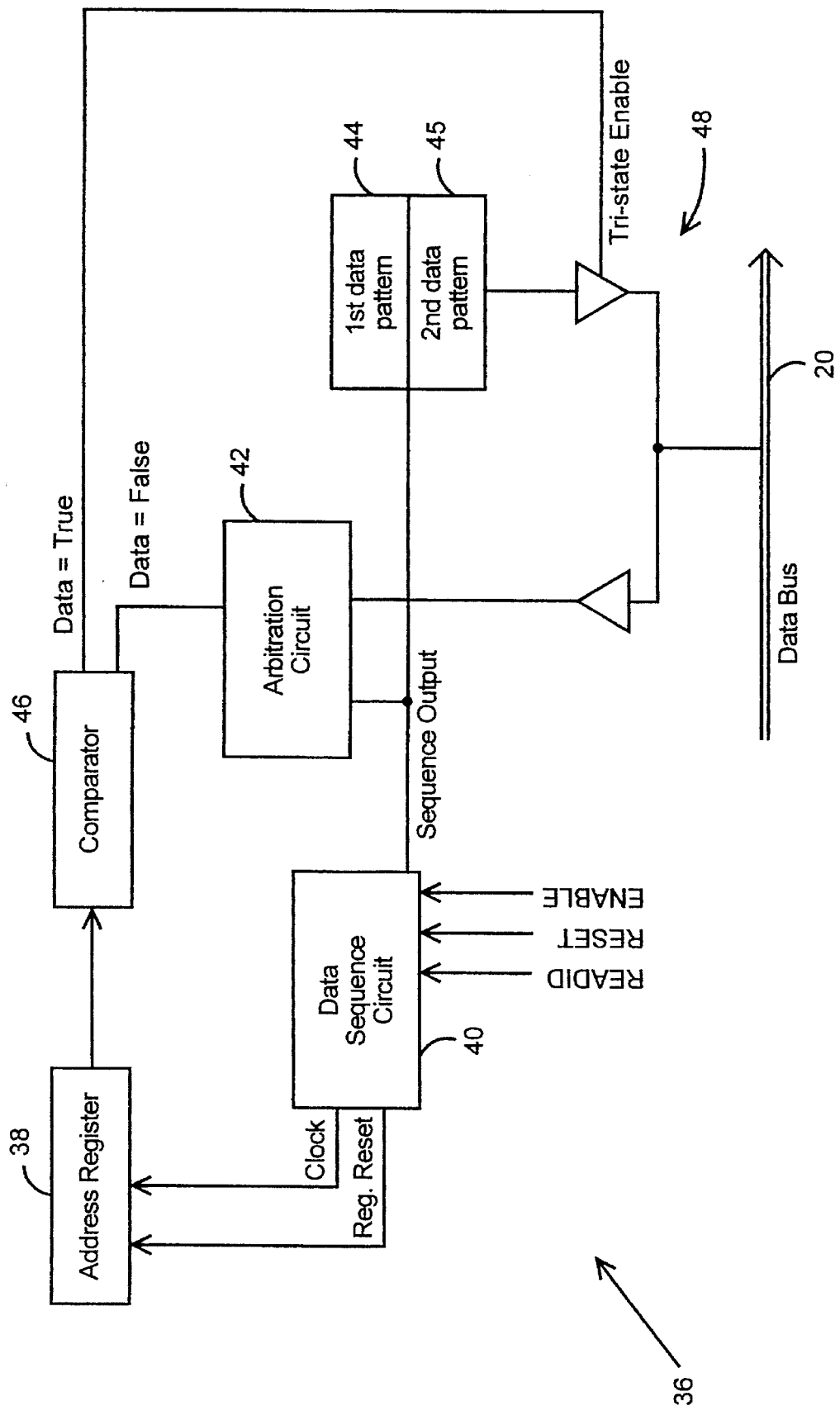
FIG. 3 is a functional block diagram of the identification circuit of the interface board of FIG. 2.

The interface board 26 also contains a unique board identification circuit 36. The board identification circuit 36 is shown in greater detain in FIG. 3. An address register 38 contains the 64-bits of dam discussed above that uniquely identify the interface board (32-bit Device Identifier and 32-bit Serial Number). The address register 38 may be part of the internal registers 32 or may be a separate device such as a ROM or EPROM. The computer system 10 uses a READ ID command that causes all interface boards to read a single address data bit from the address register 38. Some computers 12 (see FIG. 2) have a data bus 20 that floats at a logic high level, while other computers have a data bus that floats at a logic low level. To avoid possible errors in reading data from an unpredictable data bus 20, the computer system 10 executes the READ ID command two times for each of the 64-bits of the address register 38.

A data sequence circuit 40 provides timing signals used by the interface board 26 to execute certain commands. In response to a RESET command or an ENABLE command, the data sequence circuit 40 generates a register reset signal to reset the address register 38 so that the address register selects the first address data bit. In response to the READ ID command, the data sequence circuit 40 generates a clock signal to serially address each of the address data bits in the address register 38. Because the presently preferred embodiment executes the READ ID command two times for each address bit in the address register 38, the data sequence circuit 40 generates a clock cycle every two READ ID commands. The commands are discussed in greater detail below. The data sequence circuit 40 also has a sequence output to control an arbitration circuit 42 and to control the selection of a first predetermined data pattern 44 and a second predetermined data pattern 45. When the first READ ID command is sent to the interface board 26 for a particular address bit in the address register 38, the data sequence circuit 40 selects the first data pattern 44. When the second READ ID command is sent to the interface board 26 for the particular address bit in the address register 38, the data sequence circuit 40 selects the second data pattern 45.

As each of the address data bits of the address register 38 is read under control of the data sequence circuit 40, a comparator 46 determines if the current address data bit is a logic one. If the current data bit from the address register 38 is a logic one, the comparator 46 generates a data true signal to enable the tri-state output of a data bus interface circuit 48. The first time the READ ID command is sent from the computer 12 to the interface boards 26, all interface boards with a logic one for the particular address bit of the address register 38 currently being read will place the first data pattern 44, a binary "10," on the two least significant bits of the data bus 20. When the READ ID command is repeated for that particular bit of the address register 38, all interface boards 26 with a logic one for that particular bit of the address register 38 will place the second data pattern 45, a binary "01," on the two least significant bits of the data bus 20. Thus, the interface boards with a logic one for a particular bit of the address register 38 will successively place two opposite data patterns on the data bus 20. This makes it virtually impossible to accidentally interpret noise from a floating data bus 20 as data. The data bus interface circuit 48 is still enabled by data true signal from the comparator 46 because the address register 38 has not been advanced by the clock signal from the data sequence circuit 40.

The comparator 46 generates a data false signal if the current data bit of the address register 38 is a logic zero. The arbitration circuit 42 receives the data false signal and reads the data bus 20 through the bus interface circuit 48 to determine if any other interface board 26 connected to the computer 12 has a logic one in the current data bit of the address register 36. If another interface board 26 has a logic one in the current data bit of the address register 36, the arbitration circuit 42 detects both the first and second data patterns 44 on the data bus 20 and forces the interface board with the data false signal into a disabled state so that the interface board will no longer respond to requests to read the address register 38. Thus, an interface board 26 with a logic zero for a particular data bit of the address register 38 will lose an arbitration decision to an interface board 26 with a logic one for that particular data bit of the address register 38.

Figure 4:
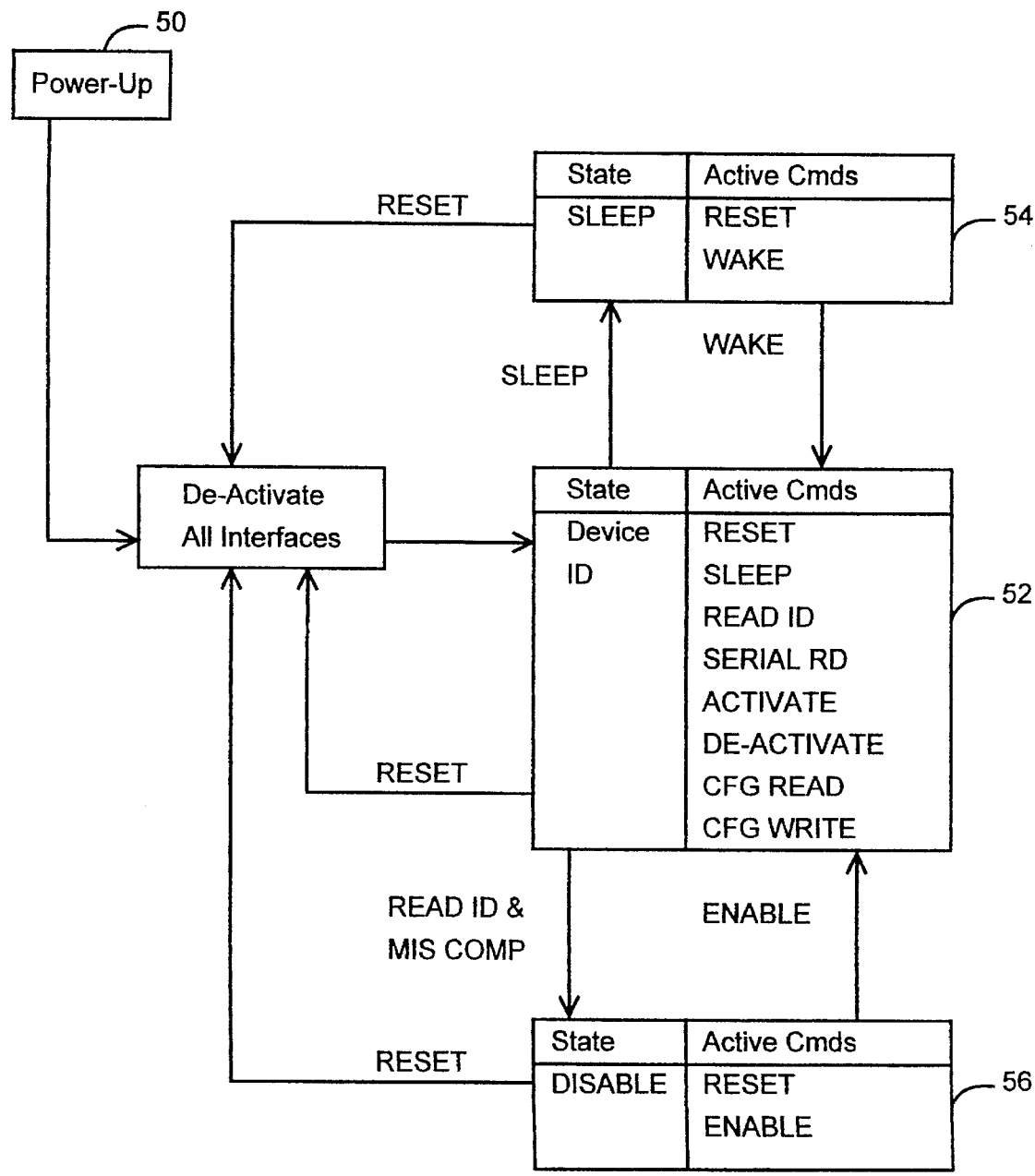
FIG. 4 is a logic state diagram of the invention of FIG. 2.

The computer system 10 has a number of logic states as shown in the state diagram of FIG. 4. A POWER-UP state 50 is entered when power is first applied to the computer 12 (FIG. 2), or when a reset command is executed. The POWER-UP state 50 will not be discussed in detail since this logic state is well known to those skilled in the art. The POWER-UP state 50 causes the interface board 26 to reset. This forces the interface board 26 to be inactive and deactivates any previously enabled I/O addresses.

Each interface board 26 has three possible logic states, the DEVICE-ID state 52, the SLEEP state 54, and the DISABLE state 56. The DEVICE-ID state 52 has a number of commands used by the computer system 10 to identify the interface board 26 and determine what resources are required for proper operation of the interface board. The SLEEP state 54 is used by the computer system 10 to place an already identified interface board 26 into a logic state so that already identified interface boards will not respond further to the interface identification procedures used in the DEVICE-ID state 52. The DISABLE state 56 is used by the computer system 10 to disable interface boards 26 which have lost an identification arbitration decision to another interface board. The arbitration procedure will be explained in detail below. An interface board in the DISABLE state 56 will not respond further to the commands of the DEVICE-ID state 52.

Each of the three logic states for the interface board 26 has commands that are unique to that particular logic state. The interface board 26 will respond to those unique commands only if the interface board is in that particular logic state. All three logic states, the DEVICE-ID state 52, the SLEEP state 54, and the DISABLE state 56, have a common RESET command. The RESET command forces the interface board 26 into its initial state. This command is generated on power-up and may also be generated by the computer system 10. As stated above, the RESET command forces the interface board 26 to be inactive and deactivates any previously enabled I/O addresses.

In the DEVICE-ID state 52, a SLEEP command forces the already identified interface board 26 from the DEVICE-ID state 52 to the SLEEP state 54 so it will not interfere in the identification of the remaining unidentified interface boards 26.

As previously discussed, the READ ID command causes the interface board 26 to read a single address data bit from the address register 38. When the interface board 26 enters the DEVICE-ID state 52 from the POWER-UP state 50, the address register 38 is reset so that the address is serially read from the first address data bit.

A SERIAL READ command allows the computer 12 to serially read configuration information from the interface board 26. The configuration information specifies which resources, such as software drivers, are required for proper operation of the interface board 26.

An ACTIVATE command is used following the configuration procedure to cause the interface board 26 to operate in the normal fashion of any interface board. That is, the interface board 26 will use the assigned parameters such as I/O address, IRQ line, and DMA line to operate like a normal interface and perform the normal functionality of the interface board such as a printer interface, a hard disk interface, or the like.

A DE-ACTIVATE command is used to deactivate the normal functionality of the interface board 26. This command may be used in preparation for a reconfiguration of the interface board 26.

A CFG WRITE command allows the computer 12 to write data to the configuration registers 34. The computer system 10 uses this command to write data such as I/O addresses, IRQ, and DMA channel select to the interface board 26.

A CFG READ command allows the computer 12 to read configuration data that is written using the CFG WRITE command.

An ENABLE command is active only in the DISABLE state 56 to force the interface board 26 from the DISABLE state to the DEVICE-ID state 52. When the interface board 26 has lost an arbitration decision, it enters the DISABLE state 56 as described above. However, the interface board 26 in the DISABLE state 56 has not been identified by the computer system 10. Therefore, when one of the interface boards 26 has been completely identified by the computer system 10, the system sends the ENABLE command to force the unidentified interface boards 26 in the DISABLE state 56 back in the DEVICE-ID state 52 and allows the system to continue the identification process.

A WAKE command is active only in the SLEEP state 54 and forces an interface board 26 from the SLEEP state to the DEVICE-ID state 56. This will allow the interface board 26 to be activated, as described above.

By using the three logic states, the computer system 10 can identify each interface board 26 without accidentally enabling more than one interface board.

After the POWER-UP state 50, the interface board 26 automatically enters the DEVICE-ID state 52. The DEVICE-ID state 52 allows the interface board 26 to be identified by the computer system 10.

Figure 5A:
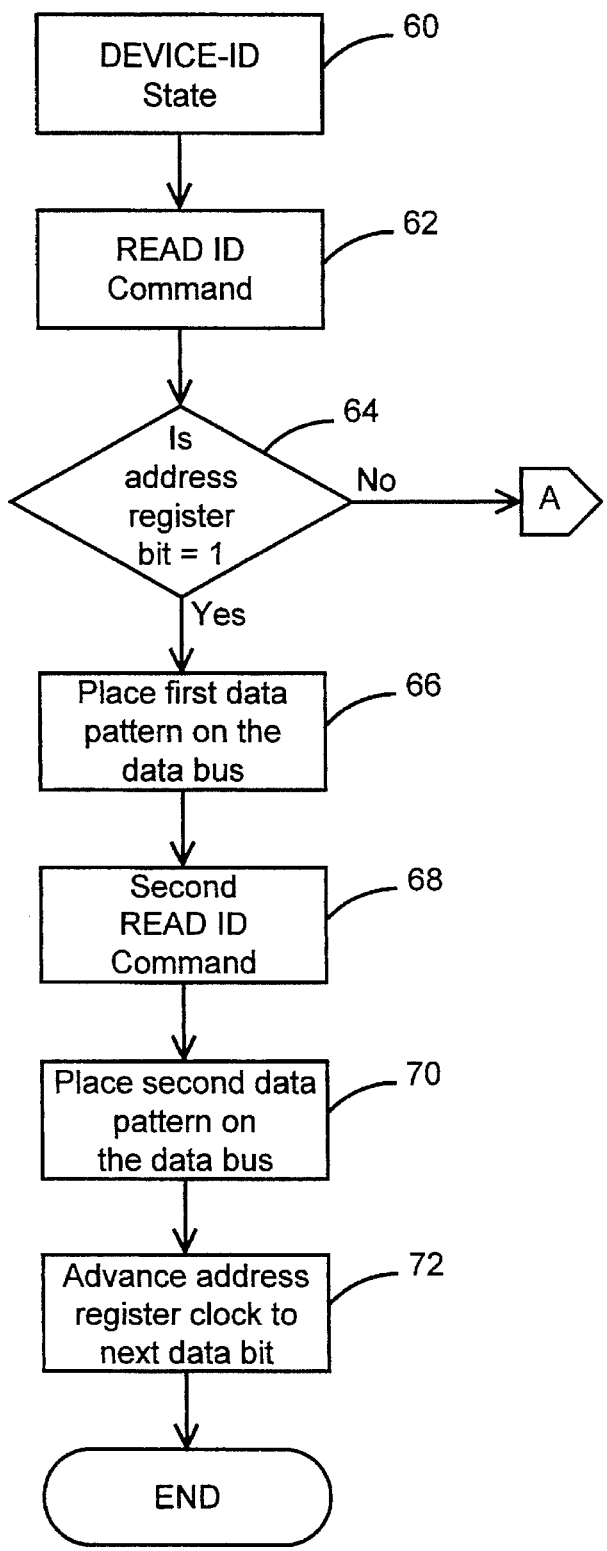
FIGS. 5A and 5B are a flowchart of the identification routine performed by the identification circuit of FIG. 3.
Figure 5B:
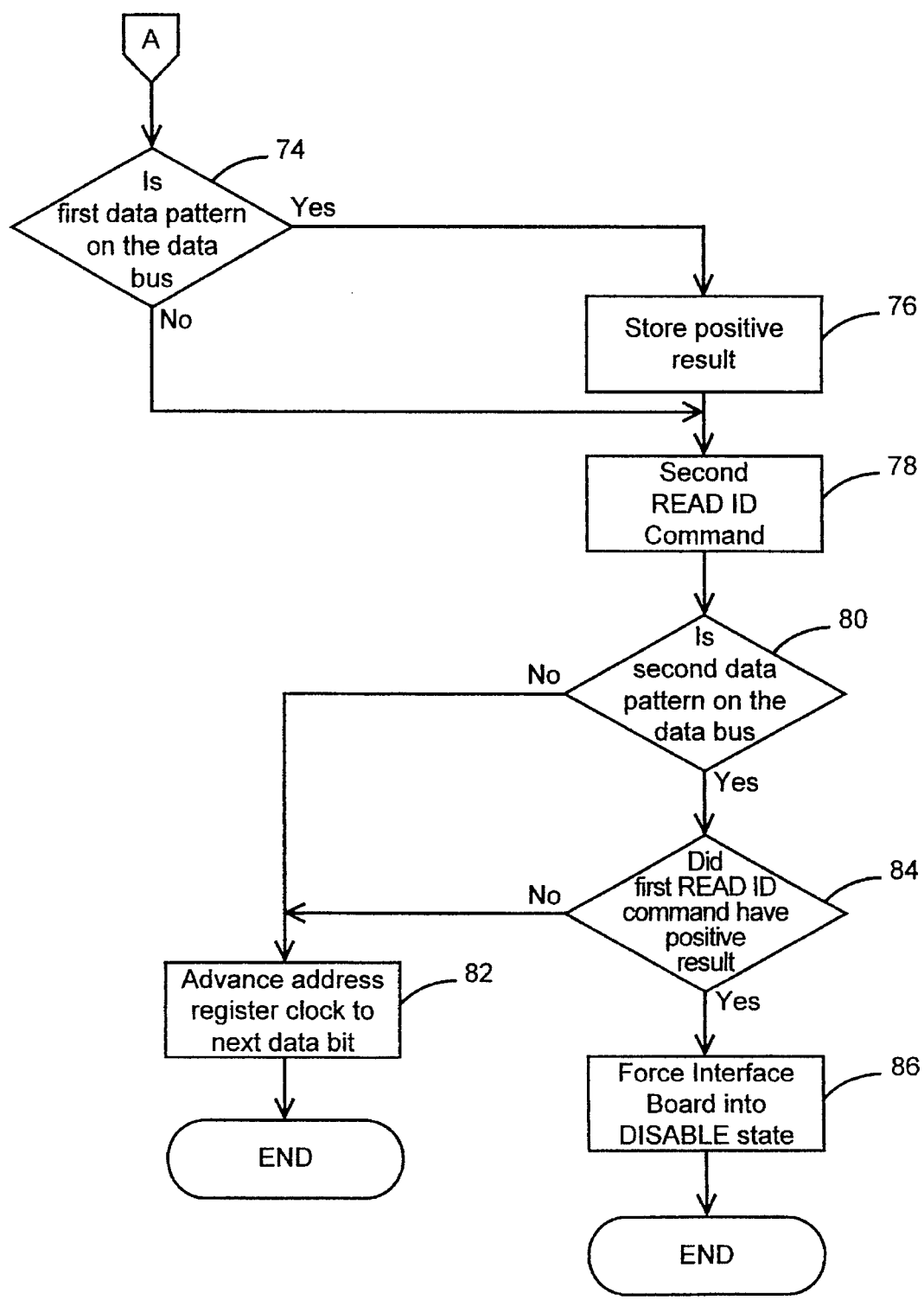

The board identification algorithm is shown in the flow chart of FIGS. 5A and 5B, where at step 60, the interface board 26 (see FIG. 2) has entered the DEVICE-ID state 52. In step 62, the computer 12 sends a command to all interface boards 26 to read the first data bit from the serial address register. The procedure for sending commands to the interface board 26 has been previously described.

In decision 64, the comparator 46 (see FIG. 3) determines if the first address bit is a logic one. If the first address bit is a logic one, the result of decision 64 is YES, and in step 66 the data bus interface circuit 48 places the first data pattern 44, a binary "10," on the two least significant bits of the data bus 20. In step 68 computer 12 sends a second READ ID command to the interface board 26. If decision 64 previously determined that the interface board 26 has a logic one in the address bit currently being read, the data bus interface circuit 48 (see FIG. 3) is still enabled by the comparator 46. In step 70, the data bus interface circuit 48 places the second data pattern 44, a binary "01," on the two least significant bits of the data bus 20. The computer 12 will store a logic one in the valid address storage location 22 (see FIG. 2) for the current data bit of the address register 38. The complete interface board identification flowchart for the computer 12 is described below. Step 72 advances the clock signal from the data sequence circuit 40 (see FIG. 3) to the address register 38 to point to the next data bit in the address register and end the reading of a single data bit from the address register. Note that this process is repeated for each of the 64-bits in the address register 38.

If the first address bit is not a logic one, the result of decision 64 is NO, and the data bus interface circuit 48 (see FIG. 3) is not enabled by the comparator 46 and, therefore, does not place any data on the data bus 20. If the result of decision 64 is NO, in decision 74, shown in FIG. 5B, the arbitration circuit 42 determines if another interface board 26 placed the first data pattern 44 (see FIG. 3), a binary "10," on the data bus 20. If another interface board 26 placed the first data pattern 44 on the data bus 20, the result of decision 74 is YES, and in step 76 the arbitration circuit 42 (see FIG. 3 ) stores a positive result indicating that there may be another interface board 26 with a logic one for that particular address bit. If there is no first data pattern 44 (a binary "10") on the data bus 20, the result of decision 74 is NO. In step 78 the computer 12 sends the second READ ID instruction to the interface board 26. Note that this step is identical to step 68 in FIG. 5A.

In decision 80, the arbitration circuit 42 determines if another interface board 26 placed the second data pattern 45 (see FIG. 3), a binary "01," on the data bus 20. If another interface board 26 placed the second data pattern on the data bus 20, the result of decision 80 is YES. If there is no interface board 26 with a logic one for the current data bit in the address register 38, there will be no second data pattern on the data bus 20. In that event, the result of decision 80 is NO. If the result of decision 80 is NO, the data interface bus circuit 48 (see FIG. 3) remains in the tri-state mode and no data is placed on the data bus 20. Step 82 advances the clock signal from the data sequence circuit 40 to the address register 38 to point to the next data bit in the address register and ends the reading of that single data bit from the address register. Note that this process is repeated for each of the 64-bits in the address register 38.

If the result of decision 80 is YES, in decision 84 the arbitration circuit 42 determines if there was a positive result stored in step 76. If there was a positive result stored in step 76, the result of decision 84 is YES, and in step 86, the arbitration circuit 42 forces the interface board 26 into the DISABLE state 56 (see FIG. 4) and the routine ends. Any interface board 26 in the DISABLE state 56 will not respond to further READ ID commands.

If there was no positive result stored in step 76, the result of decision 84 is NO, and the data interface bus circuit 48 (see FIG. 3) remains in the tri-state mode and no data is placed on the data bus 20. Step 82 advances the clock from the data sequence circuit 40 to the address register 38 to point to the next data bit in the address register and ends the reading of that single data bit from the address register. Note that this process is repeated for each of the 64-bits in the address register 38.

If there was no data placed on the data bus 20 by any interface board 26, the computer 12 will store a logic zero in the valid address storage location 22 (see FIG. 2) for the current data bit in the address register 38. As noted above, the computer 12 will repeat the READ ID command two times for each data bit in the address register 38. The computer will assign a logic zero or a logic one for each of the data bits in the address register to determine a valid address for one of the interface boards 26.

Figure 6A:
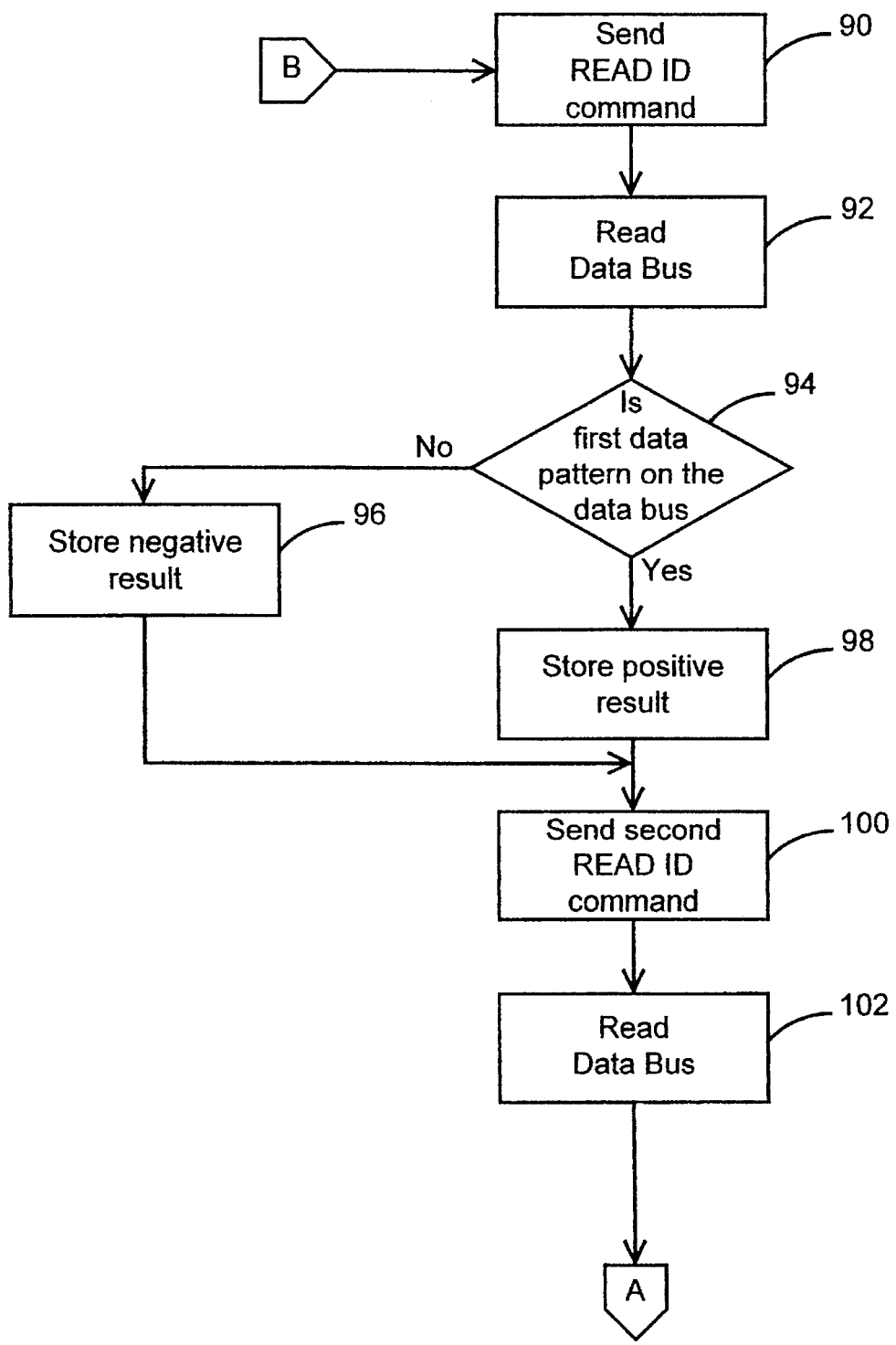
FIGS. 6A and 6B are a flowchart of the identification routine performed by the computer of FIG. 2.
Figure 6B:
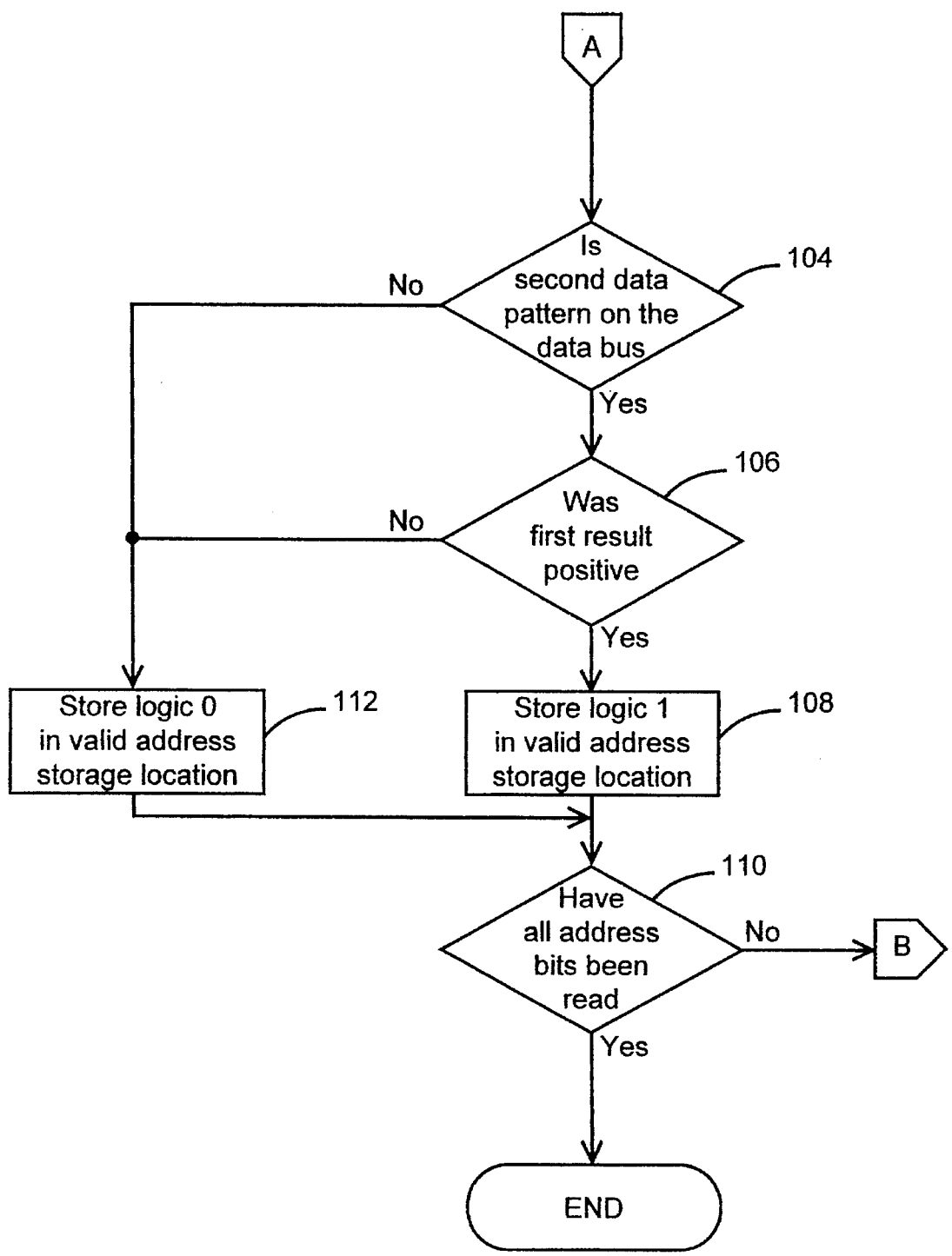

The computer identification algorithm is shown in the flowchart of FIGS. 6A and 6B. In step 90, shown in FIG. 6A, the computer 12 sends a READ ID command to the interface board 26. The procedure for sending commands to the interface board has been previously described. In step 92, the computer reads the data bus 20. In decision 94, the computer determines whether the first data pattern 44 is on the data bus 20. If the first data pattern 44 is not on the data bus 20, in step 96 the computer 12 stores a negative result. If the first data pattern 44 is on the data bus 20, in step 98 the computer 12 stores a positive result.

In step 100, the computer 12 sends a second READ ID command. In step 102, the computer reads the data bus.

In decision 104, shown on FIG. 6B, the computer 12 determines if the second data pattern 44 is present on the data bus 20. If the second data pattern is present on the data bus, the result of decision 104 is YES, and in decision 106, the computer 12 determines if there is a positive first result stored in step 98. If there was a positive first result, the result of decision 106 is YES, and in step 108, the computer 12 stores a logic one in the valid address storage location 22 (see FIG. 2) for the current address bit in the address register 38. In decision 110, the computer 12 determines whether all address bits in the address register 38 have been read. If all address bits in the address register 38 have been read, the result of decision 110 is YES and the routine ends. When all 64 bits in the address register 38 have been read, the valid address storage location 22 will contain the valid identification of one and only one interface board 26. If all of the address bits in the address register 38 have not been read, the result of decision 110 is NO and the routine loops back to step 90 in FIG. 6A.

If the second data pattern is not present on the data bus 20, the result of decision 104 is NO and in step 112, the computer 12 stores a logic zero in the valid address storage location 22. If a negative result was stored in step 96, the result of decision 106 is NO and the computer 12 in step 112 stores a logic zero in the valid address storage location 22. After step 112 stores a logic zero in the valid address storage location 22, the computer 12 goes to decision 110 to check whether all address bits in the address register 38 have been read.

As an illustration of the identification routine, assume that there is only a 4-bit address (rather than 64-bits) and that there are three interface boards 26 connected to the computer 12. The three interface boards 26 have the following addresses:

| | |
|---|---|
| Board 1 | address register = 1101 |
| Board 2 | address register = 1100 |
| Board 3 | address register = 1011. |

When the first READ ID command is sent from the computer 12 to the interface boards 26 all three boards will respond by placing the first data pattern 44 (see FIG. 3) on the data bus 20. When the computer 12 sends the second READ ID command, all three interface boards 26 will respond by placing the second data pattern 44 on the data bus 20. The computer 12 will assign to store in the address storage location 22 a logic one for the first address bit of the address register 38.

When the computer 12 sends the sequence of READ ID commands for the second data bit of the address register 38, Boards 1 and 2 in this example will respond with the first and second data patterns, respectively. However, Board 3, which does not have a logic one for the second address register data bit, will not place any data on the data bus 20 in response to the READ ID commands. Because Board 3 did not have a logic one for the second data bit in the address register 38 and at least one other of the interface boards 26 did have a logic one for the second data bit in its address register 38, Board 3 loses the arbitration decision. As a result, Board 3 will be placed in the DISABLE state 56 (see FIG. 4) and will not respond to any further READ ID commands from the computer 12. Because at least one interface board 26 responded with both the first and second data patterns 44, the computer 12 will assign to and store in the address storage location 22 a logic one to the second data bit in the address register 38.

The computer will send another sequence of READ ID commands for the third data bit in the address register 38. Because neither Board 1 nor Board 2 has a logic one for this data bit in its address register 38, neither board will respond with the first or second data patterns. Therefore, the computer 12 will assign a logic zero for this data bit in the address register 38.

The computer will send another sequence of READ ID commands for the fourth and final data bit in the address register 38. Board 1 will respond with the first and second data patterns 44. However, Board 2, which does not have a logic one for the fourth address register data bit, will not place any data on the data bus 20 in response to the READ ID commands. Because Board 2 did not have a logic one for the fourth data bit in the address register 38 and Board 1 did have a logic one for the fourth data bit in its address register 38, Board 2 loses the arbitration decision. As a result, Board 2 will be placed in the DISABLE state 56 (see FIG. 4) and will not respond to any further READ ID commands from the computer 12. Because Board 1 responded with both the first and second data patterns 44, the computer 12 will assign a logic one to the second data bit in the address register 38. Thus, the computer has determined the identity of Board 1.

Following the identification of Board 1, the computer 12 places Board 1 in the SLEEP state 54 (see FIG. 4) so that Board 1 will not interfere with the identification of the other interface boards 26 which still must occur. The computer 12 then issues an ENABLE command and Boards 2 and 3, which are in the DISABLE state 56, will respond. The address register 38 on Boards 2 and 3 is reset so that the first data bit will be read, and the same procedure described above is used on Boards 2 and 3. In the repeat identification sequence, Board 3 will lose the arbitration decision to Board 2 because Board 3 has a logic zero for the second data bit in its address register 38. Board 3 will be placed in the DISABLE state 56 (see FIG. 4) and Board 2 will be identified after all four data bits in its address register 38 are read. Board 2 will then be placed in the SLEEP state 54.

The computer 12 then issues an ENABLE command to Board 3, which is in the DISABLE state 56. The READ ID sequence is repeated and Board 3 is identified. When the computer system 10 cannot find any interface boards 26 that will respond, it knows that all interface boards have been identified. If no interface boards 26 are in the computer 12, or if all interface boards 26 have been identified, the computer system 10 will determine a valid address of all zeroes.

Once one of the interface boards 26 has been properly identified and before the identified interface board 26 is sent a SLEEP command, the computer system 10 uses the SERIAL READ command described above to determine what resources are required by that interface board. The computer system 10 assembles the resources and creates appropriate files for the interface drivers and other resources. The computer system 10 then configures each of the other interface boards 26. Configuration may include the selection of I/O addresses, IRQ channel selection onboard memory addresses, and DMA channel selection as required by the specific interface board 26. The computer system 10 sends the configuration data to the interface boards 26 using the address port 28 and the data/command port 30, as described above. The interface board 26 stores the configuration data within the internal registers 32. Portions of the internal registers 32 may be nonvolatile memory to store the configuration data. Alternatively, the computer 12 may store the configuration data for each interface board 26 in a storage location within the computer such as a hard disk (not shown) and load the configuration data into the interface boards 26 when the computer is booted.

The configuration of the interface board 26 may be performed as each of the interface boards 26 is identified by the computer system 10. In the previously preferred embodiment, the computer system 10 configures each interface board 26 as it is identified because the identified interface board 26 is the only interface board 26 that is still in the DEVICE-ID state 52 (see FIG. 4) and can accept configuration data. Alternatively, the system 10 may wait until all interface boards 26 are identified before performing the configuration.

As noted above, after one of the interface boards 26 has been identified, the computer system 10 sends a SLEEP command to the identified interface board 26 to place it in the SLEEP state 54 so that the remaining interface boards 26 may be identified.

The computer system 10 then sends the ENABLE command, which enables any interface boards 26 that are in the DISABLE state 56 as a result of losing an arbitration decision. The computer system 10 resets the address register 38 and repeats the identification routine until all of the interface boards 26 have been identified. If no unidentified interface boards remain in the computer 12, the computer system 10 will read all zeros for the address register 38. Therefore, the interface board identification is complete.

Following the identification and configuration procedures, the computer 12 operates in the same manner as in the prior art. The interface boards 26 function in the same manner as interface boards of the prior art. Thus, operating system software and application software are oblivious to the use of the present invention once the identification and configuration routines are completed.

The foregoing description provides detailed information of the presently preferred embodiment. However, it is obvious to those of skill in the art that many alternative embodiments may be used satisfactorily. For example, the particular data pattern described herein could be altered. The specific number of address bits and the arrangement of the internal registers 32 could also be modified. The computer system 10 could also be adapted to operate on computer busses other than the ISA bus described herein.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

I claim:

1. A system for the automatic identification and configuration of a computer interface board used with a computer having a data bus and an address bus, the system comprising:

a plurality of internal registers on the interface board, said internal registers addressable by the computer, at least some of said internal registers having both read and write capability;

an address port on the interface board coupled to the address bus and communicating with said internal registers to allow the computer to address said internal registers;

a command port on the interface board coupled to the data bus and communicating with said internal registers to allow the computer to read data from said internal registers and write data to said internal registers;

an address register on the interface board storing a plurality of address bits providing a unique identification of the interface board, the computer using said address port and said command port to enable the reading of said address register by the interface board;

a comparator serially receiving said plurality of address bits and generating a match signal each time a particular one of said serially received address bits has a first binary logic level;

a data bus interface operatively receiving said match signal and placing a predetermined pattern of data bits containing at least one data bit having said first binary logic level and at least one data bit having a second binary logic level opposite said first binary logic level on the data bus in response to said match signal generation, said data bus interface placing no data bits on the data bus if said match signal is not generated;

a command circuit within the computer reading the data bus and, if said predetermined pattern is on the data bus, storing said first binary logic level in an address storage location as a valid identification bit, and if said predetermined pattern is not on the data bus, storing said second binary logic level in said address storage location as a valid identification bit;

an arbitration circuit on the interface board examining the data bus if a match signal was not generated, and if said predetermined pattern is on the data bus, generating a disable signal to cause the interface board to enter a disable state, said comparator being disabled in said disabled state; and configuration registers on the interface board specifying information required for proper operation of the interface board, the computer identifying the interface board using said address storage location if all of said address bits have been read by said comparator without being disabled, the computer using said address port and said command port to enable said configuration registers.

2. The system of claim 1 wherein said data bus interface sequentially places a second predetermined data pattern on the data bus after placing said first pattern on the data bus if said match signal was generated, said arbitration circuit examining both said first and second patterns and generating said disable signal only if both said first and second patterns have been placed on the data bus, said command circuit storing said first binary logic level in said storage location only if both said first and second patterns have been placed on the data bus.

3. The system of claim 2 wherein said first pattern is a binary 10 data pattern and said second pattern is a binary 01 data pattern.

4. The system of claim 1 wherein said configuration registers contain a plurality of computer instructions required for proper operation of the interface board.

5. The system of claim 1 wherein said configuration registers contain data identifying a device driver data file, said device driver data file containing a plurality of computer instructions required for proper operation of the interface board.

6. A system for identification of a computer interface board used with a computer having a data bus and an address bus, the system comprising:

a plurality of internal registers on the interface board, said internal registers addressable by the computer, at least some of said internal registers having both read and write capability;

an address port on the interface board coupled to the address bus and communicating with said internal registers to allow the computer to address said internal registers;

a command port on the interface board coupled to the data bus and communicating with said internal registers to allow the computer to read data from said internal registers and write data to said internal registers;

an address register on the interface board storing a plurality of address bits providing a unique identification of the interface board, the computer using said address port and said command port to enable the reading of said address register by the interface board;

a comparator receiving said plurality of address bits one bit at a time and generating a match signal each time a particular one of said address bits has a first binary logic level;

a data bus interface operatively receiving said match signal and placing a predetermined pattern of data bits containing at least one data bit having said first binary logic level and at least one data bit having a second binary logic level opposite said first binary logic level on the data bus in response to said match signal generation;

a command circuit within the computer reading the data bus and, if said predetermined pattern is on the data bus, storing said first binary logic level in an address storage location as a valid identification bit, and if said predetermined pattern is not on the data bus, storing said second binary logic level in said address storage location as a valid identification bit;

an arbitration circuit on the interface board examining the data bus if a match signal was not generated, and if said predetermined pattern is on the data bus, generating a disable signal to cause the interface board to enter a disable state, said comparator being disabled in said disabled state; and configuration registers on the interface board specifying information required for proper operation of the interface board, the computer identifying the interface board using said address storage location if all of said address bits have been read by said comparator without being disabled, the computer using said address port and said command port to enable said configuration registers.

7. A system for identification of a computer interface board used with a computer having a data bus and an address bus, the system comprising:

a plurality of internal registers on the interface board, said internal registers addressable by the computer, at least some of said internal registers having both read and write capability;

an address port on the interface board coupled to the address bus and communicating with said internal registers to allow the computer to address said internal registers;

a command port on the interface board coupled to the data bus and communicating with said internal registers to allow the computer to read data from said internal registers and write data to said internal registers;

an address register on the interface board storing a plurality of address bits providing a unique identification of the interface board, the computer using said address port and said command port to enable the reading of said address register by the interface board;

a comparator receiving said plurality of address bits one bit at a time and generating a match signal each time a particular one of said address bits has a first binary logic level;

a data bus interface operatively receiving said match signal and placing a predetermined pattern of data bits containing at least one data bit having said first binary logic level and at least one data bit having a second binary logic level opposite said first binary logic level on the data bus in response to said match signal generation;

an arbitration circuit on the interface board examining the data bus if a match signal was not generated, and if said predetermined pattern is on the data bus, generating a disable signal to cause the interface board to enter a disable state, said comparator being disabled in said disabled state; and a command circuit within the computer reading the data bus and, if said predetermined pattern is on the data bus, storing said first binary logic level in an address storage location as a valid identification bit, and if said predetermined pattern is not on the data bus, storing said second binary logic level in said address storage location as a valid identification bit, the computer identifying the interface board using said address storage location if all of said address bits have been read by said comparator without being disabled.

8. A system for identification of a plurality of computer interface boards used with a computer having a data bus and an address bus, the system comprising:

a plurality of internal registers on each interface board, said internal registers addressable by the computer, at least some of said internal registers having both read and write capability;

an address port on each interface board coupled to the address bus and communicating with said internal registers to allow the computer to address said internal registers;

a command port on each interface board coupled to the data bus and communicating with said internal registers to allow the computer to read data from said internal registers and write data to said internal registers;

an address register on each interface board storing a plurality of address bits providing a unique identification of each interface board, the computer using said address port and said command port to enable the reading of said address register by each interface board;

a comparator on each interface board receiving said plurality of address bits from its own address register and generating a match signal each time a particular one of said address bits has a first binary logic level;

a data bus interface on each interface board operatively receiving said match signal and placing a predetermined pattern of data bits containing at least one data bit having said first binary logic level and at least one data bit having a second binary logic level opposite said first binary logic level on the data bus in response to said match signal generation;

an arbitration circuit on each interface board examining the data bus if a match signal was not generated by the particular interface board, and if said predetermined pattern is on the data bus, generating a disable signal to cause the particular interface board to enter a disable state, said comparator being disabled in said disabled state; and a command circuit within the computer reading the data bus and, if said predetermined pattern is on the data bus, storing said first binary logic level in an address storage location as a valid identification bit, and if said predetermined pattern is not on the data bus, storing said second binary logic level in said address storage location as a valid identification bit, the computer identifying one of the plurality of interface boards using said address storage location if all of said address bits have been read by said comparator without being disabled.

9. A system for identification of a plurality of computer interface boards used with a computer having a data bus and an address bus, the system comprising:

a plurality of internal registers on each interface board, said internal registers addressable by the computer, at least some of said internal registers having both read and write capability;

an address port on each interface board coupled to the address bus and communicating with said internal registers to allow the computer to address said internal registers;

a command port on each interface board coupled to the data bus and communicating with said internal registers to allow the computer to read data from said internal registers and write data to said internal registers;

an address register on each interface board storing a plurality of address bits providing a unique identification of each interface board, the computer using said address port and said command port to enable the reading of said address register by each interface board;

a comparator on each interface board receiving said plurality of address bits from its own address register and generating a match signal each time a particular one of said address bits has a first binary logic level;

a data bus interface on each interface board operatively receiving said match signal and placing at least one signal data bit having a predetermined logic level at a first time and having an opposite logic level at a second time on the data bus;

an arbitration circuit on each interface board examining the data bus if said match signal was not generated by the particular interface board, and if said signal data bit is on the data bus with said predetermined logic level at said first time and said opposite logic level at said second time, generating a disable signal to cause the particular interface board to enter a disable state, said comparator being disabled in said disabled state; and a command circuit within the computer reading the data bus and, if said signal data bit is on the data bus with both said predetermined logic level at said first time and said opposite logic level at said second time, storing said first binary logic level in an address storage location as a valid identification bit, and if said signal data bit is not on the data bus with both said predetermined logic level at said first time and said opposite logic level at said second time, storing a second opposite binary logic level in said address storage location as a valid identification bit, the computer identifying one of the plurality of interface boards using said address storage location if all of said address bits have been read by said comparator without being disabled.

10. A system for identification of a computer interface board used with a computer having a data bus, an address bus and a command circuit reading the data bus to determine if at least one signal data bit having a first logic level at a first time and a second logic level at a second time is on the data bus, storing a first binary logic level in an address storage location as a valid identification bit if the signal data bit having the first and second logic levels at the first and second times, respectively, is on the data bus, and if the signal data bit having the first and second logic levels at the first and second times, respectively, is not on the data bus, storing a second opposite binary logic level in said address storage location as a valid identification bit, the system comprising:

a plurality of internal registers on the interface board, said internal registers addressable by the computer, at least some of said internal registers having both read and write capability;

an address port on the interface board coupled to the address bus and communicating with said internal registers to allow the computer to address said internal registers;

a command port on the interface board coupled to the data bus and communicating with said internal registers to allow the computer to read data from said internal registers and write data to said internal registers;

an address register on the interface board storing a plurality of address bits providing a unique identification of the interface board, the computer using said address port and said command port to enable the reading of said address register by the interface board;

a comparator receiving said plurality of address bits one bit at a time and generating a match signal each time a particular one of said address bits has a predetermined binary logic level;

a data bus interface operatively receiving said match signal and placing the signal data bit having the first logic level on the data bus at the first time and changing the signal data bit to the second logic level at the second time;

an arbitration circuit on the interface board examining the data bus if a match signal was not generated, and if the signal data bit having the first and second logic levels at the first and second times, respectively, is on the data bus, generating a disable signal to cause the interface board to enter a disable state, said comparator being disabled in said disabled state; and configuration registers on the interface board specifying information required for proper operation of the interface board, the computer identifying the interface board using the address storage location if all of said address bits have been read by said comparator without being disabled, the computer using said address port and said command port to enable said configuration registers.

11. A system for identification of a computer interface board used with a computer having a data bus, an address bus and a command circuit reading the data bus to determine if at least one signal data bit having a first logic level at a first time and a second logic level at a second time is on the data bus, storing a first binary logic level in an address storage location as a valid identification bit if the signal data bit having the first and second logic levels at the first and second times, respectively, is on the data bus, and if the signal data bit having the first and second logic levels at the first and second times, respectively, is not on the data bus, storing a second opposite binary logic level in said address storage location as a valid identification bit, the system comprising:

a plurality of internal registers on the interface board, said internal registers addressable by the computer, at least some of said internal registers having both read and write capability;

an address port on the interface board coupled to the address bus and communicating with said internal registers to allow the computer to address said internal registers;

a command port on the interface board coupled to the data bus and communicating with said internal registers to allow the computer to read data from said internal registers and write data to said internal registers;

an address register on the interface board storing a plurality of address bits providing a unique identification of the interface board, the computer using said address port and said command port to enable the reading of said address register by the interface board;

a comparator receiving said plurality of address bits and generating a match signal each time a particular one of said address bits has a predetermined binary logic level;

a data bus interface operatively receiving said match signal and placing the signal data bit having the first logic level on the data bus at the first time and changing the signal data bit to the second logic level at the second time; and an arbitration circuit on the interface board examining the data bus if a match signal was not generated, and if the signal data bit is on the data bus, generating a disable signal to cause the interface board to enter a disable state, said comparator being disabled in said disabled state, the computer identifying the interface board using the address storage location if all of said address bits have been read by said comparator without being disabled.

12. A system for identification of a plurality of computer interface boards used with a computer having a data bus, an address bus, and a command circuit reading the data bus to determine if a predetermined pattern containing at least one data bit having said first binary logic level and at least one data bit having a second opposite binary logic level is on the data bus, storing a first binary logic level in an address storage location as a valid identification bit if the predetermined data pattern is on the data bus, and if the predetermined pattern is not on the data bus, storing the second binary logic level in said address storage location as a valid identification bit, the system comprising:

a plurality of internal registers on each interface board, said internal registers addressable by the computer, at least some of said internal registers having both read and write capability;

an address port on each interface board coupled to the address bus and communicating with said internal registers to allow the computer to address said internal registers;

a command port on each interface board coupled to the data bus and communicating with said internal registers to allow the computer to read data from said internal registers and write data to said internal registers;

an address register on each interface board storing a plurality of address bits providing a unique identification of each interface board, the computer using said address port and said command port to enable the reading of said address register by each interface board;

a comparator on each interface board receiving said plurality of address bits from its own address register one bit at a time and generating a match signal each time a particular one of said address bits has a predetermined binary logic level;

a data bus interface on each interface board operatively receiving said match signal and placing the predetermined pattern of data bits on the data bus in response to the generation of said match signal; and an arbitration circuit on each interface board examining the data bus if a match signal was not generated by the particular interface board, and if the predetermined pattern is on the data bus, generating a disable signal to cause the particular interface board to enter a disable state, said disabled interface board not placing the predetermined data pattern on the data bus while in said disabled state, the computer identifying one of the interface boards using the address storage location if all of said address bits have been read by said comparator without being disabled.

13. A system for identification of a plurality of computer interface boards used with a computer having a data bus, an address bus and a command circuit reading the data bus to determine if at least one signal data bit having a first logic level at a first time and a second logic level at a second time is on the data bus, storing a first binary logic level in an address storage location as a valid identification bit if the signal data bit having the first and second logic levels at the first and second times, respectively, is on the data bus, and if the signal data bit having the first and second logic levels at the first and second times, respectively, is not on the data bus, storing a second opposite binary logic level in said address storage location as a valid identification bit, the system comprising:

a plurality of internal registers on each interface board, said internal registers addressable by the computer, at least some of said internal registers having both read and write capability;

an address port on each interface board coupled to the address bus and communicating with said internal registers to allow the computer to address said internal registers;

a command port on each interface board coupled to the data bus and communicating with said internal registers to allow the computer to read data from said internal registers and write data to said internal registers;

an address register on each interface board storing a plurality of address bits providing a unique identification of each interface board, the computer using said address port and said command port to enable the reading of said address register by each interface board;

a comparator on each interface board receiving said plurality of address bits from its own address register and generating a match signal each time a particular one of said address bits has a predetermined binary logic level;

a data bus interface on each interface board operatively receiving said match signal and placing the signal data bit having the first logic level on the data bus at the first time and changing the signal data bit to the second logic level at the second time; and an arbitration circuit on each interface board examining the data bus if a match signal was not generated by the particular interface board, and if the signal data bit having the first and second logic levels at the first and second times, respectively, is on the data bus, generating a disable signal to cause the particular interface board to enter a disable state, said comparator being disabled in said disabled state, the computer identifying one of the interface boards using the address storage location if all of said address bits have been read by said comparator without being disabled.

14. The system of claim 13, further including means for enabling an interface board in said disabled state, said enabled interface board placing the signal data bit having the first and second logic levels at the first and second times, respectively, on the data bus if said match signal is generated, the computer using said address port, said command port, said address register, said comparator, said data bus interface, and said arbitration circuit to identify said enabled interface board.

15. The system of claim 13, further including configuration registers on each interface board, said configuration registers specifying information required for proper operation of the interface board.

16. The system of claim 15 wherein said configuration registers contains a plurality of computer instructions required for proper operation of the interface board.

17. The system of claim 15 wherein said configuration registers contain data identifying a device driver data file, said device driver data file containing a plurality of computer instructions required for proper operation of the interface board.

18. A method for identification of a computer interface board used with a computer having a data bus and an address bus, the method comprising the steps of:

(a) addressing an address register on the interface board, the address register storing a plurality of address bits providing a unique identification of the interface board;

(b) reading a single address bit from said address register;

(c) comparing said single address bit with a predetermined binary logic level;

(d) generating a match signal if said single address bit has said predetermined binary logic level;

(e) placing a predetermined pattern of data bits containing at least one data bit having a first binary logic level and at least one data bit having a second opposite binary logic level on the data bus if said match signal was generated;

(f) causing the interface board to read the data bus if said match signal was not generated and if said predetermined pattern is on the data bus, generating a disable signal to cause the interface board to enter a disable state, said steps (b)–(f) being disabled in said disabled state;

(g) causing the computer to read the data bus and, if said predetermined pattern is on the data bus, storing a data bit having said first binary logic level in an address storage location as a valid identification bit, and if said predetermined pattern is not on the data bus, storing said data bit having said second binary logic level in said address storage location as a valid identification bit; and (h) repeating steps (b)–(h) until all of said plurality of address bits has been read, the computer identifying the interface board using said address storage location if all of said address bits have been read without step (f) generating said disable signal.

19. The method of claim 18, further including the step of reading configuration registers using said address storage location, said configuration registers containing information required for the proper use of the interface board.

20. The method of claim 18, further including the step of assigning parameters including an I/O address to the interface board after the computer has identified the interface board using said address storage location if all of said address bits have been read without step (f) generating a disable signal.

21. A method for identification of a computer interface board used with a computer having a data bus and an address bus, the method comprising the steps of:

(a) addressing an address register on the interface board, the address register storing a plurality of address bits providing a unique identification of the interface board;

(b) reading a single address bit from said address register;

(c) comparing said single address bit with a predetermined binary logic level;

(d) generating a match signal if said single address bit has said predetermined binary logic level;

(e) placing at least one signal data bit having a first logic level at a first time and a second logic level at a second time on the data bus if said match signal was generated;

(f) causing the interface board to read the data bus if said match signal was not generated and if said signal data bit having the first and second logic levels at the first and second times, respectively, is on the data bus, generating a disable signal to cause the interface board to enter a disable state, said steps (b)–(f) being disabled in said disabled state;

(g) causing the computer to read the data bus and, if said signal data bit having the first and second logic levels at the first and second times, respectively, is on the data bus, storing said first binary logic level in an address storage location as a valid identification bit, and if said signal data bit having the first and second logic levels at the first and second times, respectively, is not on the data bus, storing a second opposite binary logic level in said address storage location as a valid identification bit; and (h) repeating steps (b)–(h) until all of said plurality of address bits has been read, the computer identifying the interface board using said address storage location if all of said address bits have been read without step (f) generating a disable signal.

22. A method for identification of a plurality of computer interface boards used with a computer having a data bus, an address bus and a command circuit reading the data bus to determine if at least one signal data bit having a first logic level at a first time and a second logic level at a second time is on the data bus, storing a first binary logic level in an address storage location as a valid identification bit if the signal data bit having the first and second logic levels at the first and second times, respectively, is on the data bus, and if the signal data bit having the first and second logic levels at the first and second times, respectively, is not on the data bus, storing a second opposite binary logic level in said address storage location as a valid identification bit, the method comprising the steps of:

(a) simultaneously addressing an address register on each interface board, the address register storing a plurality of address bits providing a unique identification of each interface board;

(b) reading a single address bit from said address register on each interface board;

(c) comparing said single address bit with a predetermined binary logic level on each interface board;

(d) generating a match signal on a particular interface board if said single address bit on said particular interface board has said predetermined binary logic level;

(e) placing at least one signal data bit having the first and second logic levels at the first and second times, respectively, on the data bus if said match signal was generated;

(f) causing the interface board to read the data bus if said match signal was not generated and if said signal data bit having the first and second logic levels at the first and second times, respectively, is on the data bus, generating a disable signal to cause the interface board to enter a disable state, said steps (b)–(f) being disabled in said disabled state;

(g) causing the computer to read the data bus and, if said signal data bit having the first and second logic levels at the first and second times, respectively, is on the data bus, storing said first binary logic level in an address storage location as a valid identification bit, and if said signal data bit having the first and second logic levels at the first and second times, respectively, is not on the data bus, storing a second opposite binary logic level in said address storage location as a valid identification bit; and (h) repeating steps (b)–(h) until all of said plurality of address bits has been read, the computer identifying one interface board using said address storage location if all of said address bits have been read without step (f) generating a disable signal.

23. The method of claim 22, further including the steps of:

(i) placing said one identified interface board in a sleep state, said one interface board not placing said signal data bit on the data bus; and (j) enabling previously disabled interface boards and repeating steps (a)–(i) until all interface boards have been identified.

24. The method of claim 22, further including the step of reading configuration registers using said address storage location, said configuration registers containing information required for the proper use of said one identified interface board.

25. The method of claim 22, further including the step of assigning parameters including an I/O address to said one identified interface board.

\* \* \* \* \*